(12) United States Patent
Bardwell et al.

(10) Patent No.: US 8,644,473 B1
(45) Date of Patent: Feb. 4, 2014

(54) METHOD AND SYSTEM FOR PROVIDING TELEPHONY SERVICES

(75) Inventors: Robert Bardwell, Strongsville, OH (US); Steven N. Large, West Palm Beach, FL (US); A. Brent Summers, Louisville, KY (US); Jeffrey E. Chulick, Ashburn, VA (US); Craig Thrall, Marshfield, MA (US); Scott Hallock, Longmont, CO (US); Tom Bamert, Hoboken, NJ (US)

(73) Assignee: Ernst & Young U.S. LLP, Secaucus, NJ (US)

( * ) Notice: Subject to any disclaimer, the term of this patent is extended or adjusted under 35 U.S.C. 154(b) by 1029 days.

(21) Appl. No.: 12/430,456

(22) Filed: Apr. 27, 2009

(51) Int. Cl.
*H04M 3/42* (2006.01)

(52) U.S. Cl.
USPC .............. 379/201.01; 379/201.02; 379/201.1; 379/207.02; 379/212.01

(58) Field of Classification Search
USPC ............... 379/93.02, 265.02, 265.04, 201.01, 379/201.02, 201.1, 207.02, 207.12, 212.01
See application file for complete search history.

(56) References Cited

U.S. PATENT DOCUMENTS

| | | | |
|---|---|---|---|
| 6,577,726 B1 * | 6/2003 | Huang et al. ............. | 379/265.02 |
| 7,289,619 B2 | 10/2007 | Vivadelli et al. | |
| 2004/0264665 A1 * | 12/2004 | Idoni et al. ............... | 379/201.01 |
| 2005/0180555 A1 * | 8/2005 | Sarp et al. ................ | 379/220.01 |
| 2008/0186963 A1 * | 8/2008 | Trasi et al. ..................... | 370/389 |
| 2010/0070314 A1 * | 3/2010 | Jethani et al. ..................... | 705/6 |

* cited by examiner

*Primary Examiner* — Khai N Nguyen
(74) *Attorney, Agent, or Firm* — Lando & Anastasi, LLP

(57) ABSTRACT

A method is provided for directing calls placed to a telephone number associated with a user according to a reservation identifying the user, a workspace, and a start time. The method includes acts of receiving a first message from a telephone device located at the workspace in response to a first input at the telephone device on or after the start time, retrieving the reservation from a reservation database in response to receiving the first message, sending a second message to the telephone device based at least in part on a portion of the reservation identifying the user, receiving a third message sent in response to a second input at the telephone device, the third message including an identifier of the telephone device, retrieving the telephone number associated with the user from a user database, and directing calls placed to the telephone number associated with the user to the telephone device.

28 Claims, 7 Drawing Sheets

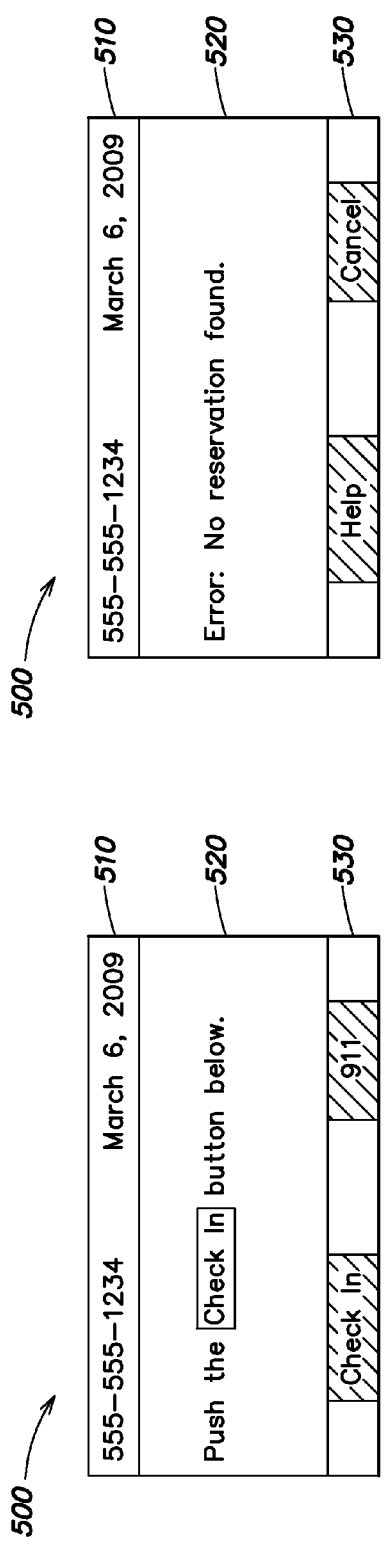
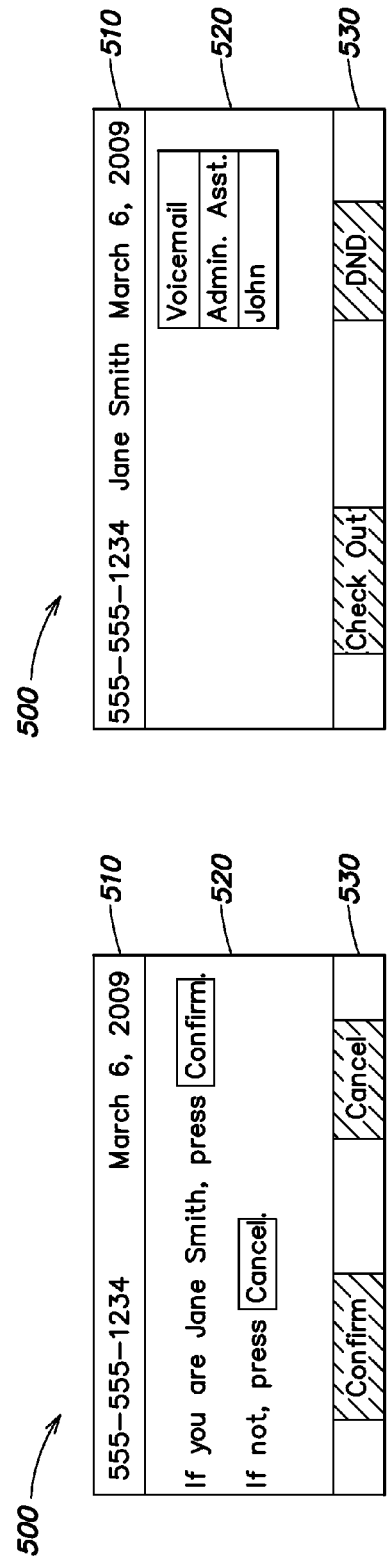
FIG. 5A
FIG. 5B
FIG. 5C
FIG. 5D

METHOD AND SYSTEM FOR PROVIDING TELEPHONY SERVICES

BACKGROUND

1. Field of the Invention

The present invention is directed to methods and systems for providing workspace mobility and hoteling. More particularly, methods and systems are provided for managing and providing telephony services to particular individuals whose workspace location can change from time to time.

2. Discussion of Related Art

There are a variety of tools and techniques for managing and providing telephony services in a workplace environment. Organizations have long used private branch exchanges (PBXs) to deploy and maintain telephone service to employees at a particular physical location, for example, a work site such as an office building. By connecting individual phones to the public switched telephone network via a trunk line, the organization could route an individual employee's extension to wherever the employee was located at the work site, and could reroute the extension as appropriate.

However, the PBX is of little use when a user needs telephony services in a location physically distant from the location of the PBX system. Furthermore, the PBX requires too much manual intervention to be efficient when a user frequently moves locations, or when a particular work location, for example, a cubicle, will host a number of different users in the course of a relatively short period of time.

"Hoteling" is a term given to the practice of providing unassigned workspaces that can be reserved or claimed by different users at different times. Specifically, a user may reserve a workspace, such as a cubicle or office, for a particular duration of time. During that time, she may be provided telephony or other custom services at that location. Hoteling thus allows mobile workers to have access to a shared workspace at one or more locations as needed without requiring a dedicated workspace for each mobile worker at each location.

SUMMARY

As noted above, automated methods for managing telephony services and other workplace assets have been developed. Specifically, systems have been developed that allow users to make advance reservations that will cause their telephony services to be activated at a particular workspace at a particular time. However, these systems may be limited in that they carry out the activation or termination of telephony services regardless of the user's actual location. Thus, there is a need for telephony management methods and systems that accepts reservations for telephony services for a particular user at a particular workspace and time, and that activate those telephony services only upon confirmation that the user is physically present at that workspace.

The present invention is directed to methods and systems configured to accept reservations for telephony services for a particular user at a particular workspace and time, and to activate those telephony services only upon confirmation that the user is physically present at that workspace. These telephony services may include directing all calls for the user to a telephone in that workspace, and providing outgoing telephone service on the telephone. Additional personalized telephony features may be deployed to the phone at the workspace as well, including the user's speed dial settings, personalized greeting, custom ringer settings, or other options.

According to one aspect of the present invention, a method is provided for directing calls placed to a telephone number associated with a user according to a reservation identifying the user, a workspace, and a start time. The method includes acts of receiving a first message from a telephone device located at the workspace in response to a first input at the telephone device on or after the start time, retrieving the reservation from a reservation database in response to receiving the first message, sending a second message to the telephone device based at least in part on a portion of the reservation identifying the user, receiving a third message sent in response to a second input at the telephone device, the third message including an identifier of the telephone device, retrieving the telephone number associated with the user from a user database, and directing calls placed to the telephone number associated with the user to the telephone device.

According to one embodiment, the act of receiving the first message may include an act of receiving a URL request on a web server. In another embodiment, the second message may include a portion identifying the user. In a further embodiment, the second message may include a name of the user.

According to another embodiment, the identifier of the telephone device may include a MAC address of the telephone device. In yet another embodiment, the act of directing may include sending a fourth message to a switching server requesting that the switching server route to the telephone device telephone calls placed to the number associated with the user. In another embodiment, the act of retrieving the reservation may include determining that calls placed to the telephone number associated with the user are not already directed to a second telephone device other than the telephone device.

In still another embodiment, the act of retrieving the reservation may include determining that calls placed to the telephone number associated with the user are already directed to a second telephone device other than the telephone device, and ceasing to direct to the second telephone device calls placed to the telephone number associated with the user. In this embodiment, the act of ceasing to direct may include sending a fourth message to a switching server requesting that the switching server not route to the second telephone device telephone calls placed to the number associated with the user.

In another embodiment, the method may further comprise an act of validating at least one parameter of the reservation prior to receiving the first message, the act of validating the at least one parameter of the reservation including at least one of determining that a portion of the reservation identifying the workspace identifies a valid workspace, and determining that a portion of the reservation identifying the user identifies a valid user. In yet another embodiment, the reservation may further identify an end time, and the method further comprises an act of ceasing, on or after the end time, to direct to the telephone device calls placed to the telephone number associated with the user.

In another embodiment, the act of retrieving the telephone number may include an act of retrieving a user profile uniquely corresponding to the user, the user profile including the telephone number associated with the user and a set of telephone device configuration parameters uniquely corresponding to the user, and wherein the act of directing further comprises providing the set of telephone device configuration parameters to the telephone device. In this embodiment, the telephone device may include at least one configurable function button, and the set of telephone device configuration parameters may include a mapping of the at least one configurable function button to at least one telephone function. In yet a further aspect of this embodiment, the at least one telephone function includes at least one of speed-dialing a specified telephone number and connecting to a voice mailbox of the user.

According to another aspect of the present invention, a computer readable medium is provided. The computer readable medium comprises computer executable instructions that, when executed, perform a method of directing calls placed to a telephone number associated with a user according to a reservation that identifies the user, a workspace, and a start time. The method comprises acts of receiving a first message from a telephone device located at the workspace in response to a first input at the telephone device on or after the start time, retrieving the reservation from a reservation database in response to receiving the first message, sending a second message to the telephone device based at least in part on a portion of the reservation identifying the user, receiving a third message sent in response to a second input at the telephone device, the third message including an identifier of the telephone device, retrieving the telephone number associated with the user from a user database, and directing calls placed to the telephone number associated with the user to the telephone device.

In one embodiment, the act of directing may include receiving a fourth message, at a switching server, requesting that the switching server route to the telephone device telephone calls placed to the number associated with the user. In another embodiment, the act of retrieving the reservation includes determining that calls placed to the telephone number associated with the user are not already directed to a second telephone device other than the telephone device.

In yet another embodiment, the act of retrieving the reservation includes determining that calls placed to the telephone number associated with the user are already directed to a second telephone device other than the telephone device, and ceasing to direct to the second telephone device calls placed to the telephone number associated with the user. In a further aspect of this embodiment, the act of ceasing to direct includes receiving a fourth message, at a switching server, requesting that the switching server not route to the second telephone device telephone calls placed to the number associated with the user.

In another embodiment, the method may further comprise an act of validating at least one parameter of the reservation prior to receiving the first message, the act of validating the at least one parameter of the reservation including at least one of determining that a portion of the reservation identifying the workspace identifies a valid workspace, and determining that a portion of the reservation identifying the user identifies a valid user.

In yet another embodiment, the reservation may further identify an end time, and the method may further comprise an act of ceasing, on or after the end time, to direct to the telephone device calls placed to the telephone number associated with the user.

In another embodiment, the act of retrieving the telephone number may include an act of retrieving a user profile uniquely corresponding to the user, the user profile including the telephone number associated with the user and at least one telephone device configuration parameter uniquely corresponding to the user, and the act of directing may further comprise providing the at least one telephone device configuration parameter to the telephone device. In a further aspect of this embodiment, the telephone device may include at least one configurable function button, and the at least one telephone device configuration parameter may include a mapping of the at least one configurable function button to at least one telephone function. In yet a further aspect of this embodiment, the at least one telephone function includes at least one of speed-dialing a specified telephone number and connecting to a voice mailbox of the user.

According to another aspect of the present invention, a system is provided. The system comprises a telephone device located at a specific location, the telephone device configured to send a first message in response to a first input, and a server configured to receive the first message, and responsive to a determination that a reservation exists associating a user with the specific location during a time interval, to request a switching server to direct to the telephone device calls placed to a telephone number associated with the user.

In one embodiment, the server may be further configured to validate at least one parameter of the reservation by determining that a first portion of the reservation identifying the specific location identifies a valid specific location and by determining that second portion of the reservation identifying the user identifies a valid user.

In another embodiment, the server may be further configured to retrieve a user profile uniquely corresponding to the user, the user profile including the telephone number associated with the user and a set of telephone device configuration parameters uniquely corresponding to the user, wherein the server is further configured to provide the set of telephone device configuration parameters to the telephone device. In a further aspect of this embodiment, the telephone device may include at least one configurable function button, and the telephone device may be configured to map the at least one configurable function button to at least one telephone function based upon the set of telephone device configuration parameters uniquely corresponding to the user.

According to another aspect of the present invention, a method is provided for directing calls placed to a telephone number associated with a user according to a reservation identifying the user, a workspace, and a start time. The method includes acts of receiving a first message sent on or after the start time from a telephone device located at the workspace, retrieving the reservation from a reservation database, determining that the reservation associates the user, the workspace, and the start time, and directing to the telephone device calls placed to the telephone number associated with the user.

In one embodiment, the act of determining may further include receiving a second message from the telephone device, the second message confirming an identity of the user. In another embodiment, the act of directing may include receiving a second message, at a switching server, requesting that the switching server route to the telephone device telephone calls placed to the telephone number associated with the user. In another embodiment, the method may further comprise an act of determining that calls placed to the telephone number associated with the user are not already directed to a second telephone device other than the telephone device.

In yet another embodiment, the method may further comprise acts of determining that calls placed to the telephone number associated with the user are already directed to a second telephone device other than the telephone device, and ceasing to direct to the second telephone device calls placed to the telephone number associated with the user. In a further aspect of this embodiment, the act of ceasing to direct may include an act of receiving a second message, at a switching server, requesting that the switching server not route to the second telephone device telephone calls placed to the number associated with the user.

According to another aspect of the present invention, a method of directing calls to a telephone device located at a workspace is provided. The method includes the acts of receiving a first message at a current time from the telephone device located at the workspace, retrieving a reservation from a reservation database, the reservation associating the workspace and a time interval with a user, determining that the current time is within the time interval, and directing to the telephone device calls placed to a telephone number associated with the user.

According to yet another aspect of the present invention, a method of associating a telephone device at a workspace with a telephone number associated with a user is provided. The method includes the acts of receiving an input at the telephone device on or after a reservation start time, sending a first message in response to the input, receiving a second message at the telephone device comprising a portion identifying the user, receiving, at the telephone device, a second input confirming the identity of the user, sending a third message in response to receiving the second input, and receiving at the telephone device telephone calls placed to the telephone number associated with the user.

In one embodiment, the method may further include an act of displaying, in response to receiving the second message, a request for the second input, the request being displayed on a display of the telephone device. In another embodiment, the first message may include a portion identifying the workspace and the third message may include an identifier of the telephone device.

In yet another embodiment, the method may further include the act of receiving, at the telephone device, a fourth message including at least one configuration parameter uniquely corresponding to the user. In a further embodiment, the method may include the act of configuring at least one function of the telephone device based upon the at least one configuration parameter.

According to another aspect of the present invention, a method is provided for associating a telephone device at a workspace with a telephone number associated with a user. The method comprises receiving an input at the telephone device on or after a reservation start time, sending a first message indicating the presence of the user at the workspace in response to the input, and receiving at the telephone device telephone calls placed to the telephone number associated with the user.

In one embodiment, the method includes an act of displaying, on a display of the telephone device, a request for a second input confirming the presence of the user at the workspace, wherein the act of sending the first message is performed in response to receiving the second input. In another embodiment, the method further includes an act of receiving, at the telephone device, a second message including at least one configuration parameter uniquely corresponding to the user, and configuring at least one function of the telephone device based upon the at least one configuration parameter.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5A depicts a graphical interface of a telephone in accordance with an embodiment of the present invention in which the telephone is in a ready state;

FIG. 5B depicts the graphical interface of FIG. 5A in an error state;

FIG. 5C depicts the graphical interface of FIG. 5A in a confirmation state;

FIG. 5D depicts the graphical interface of FIG. 5A in a checked-in state;

DETAILED DESCRIPTION

Figure 1:
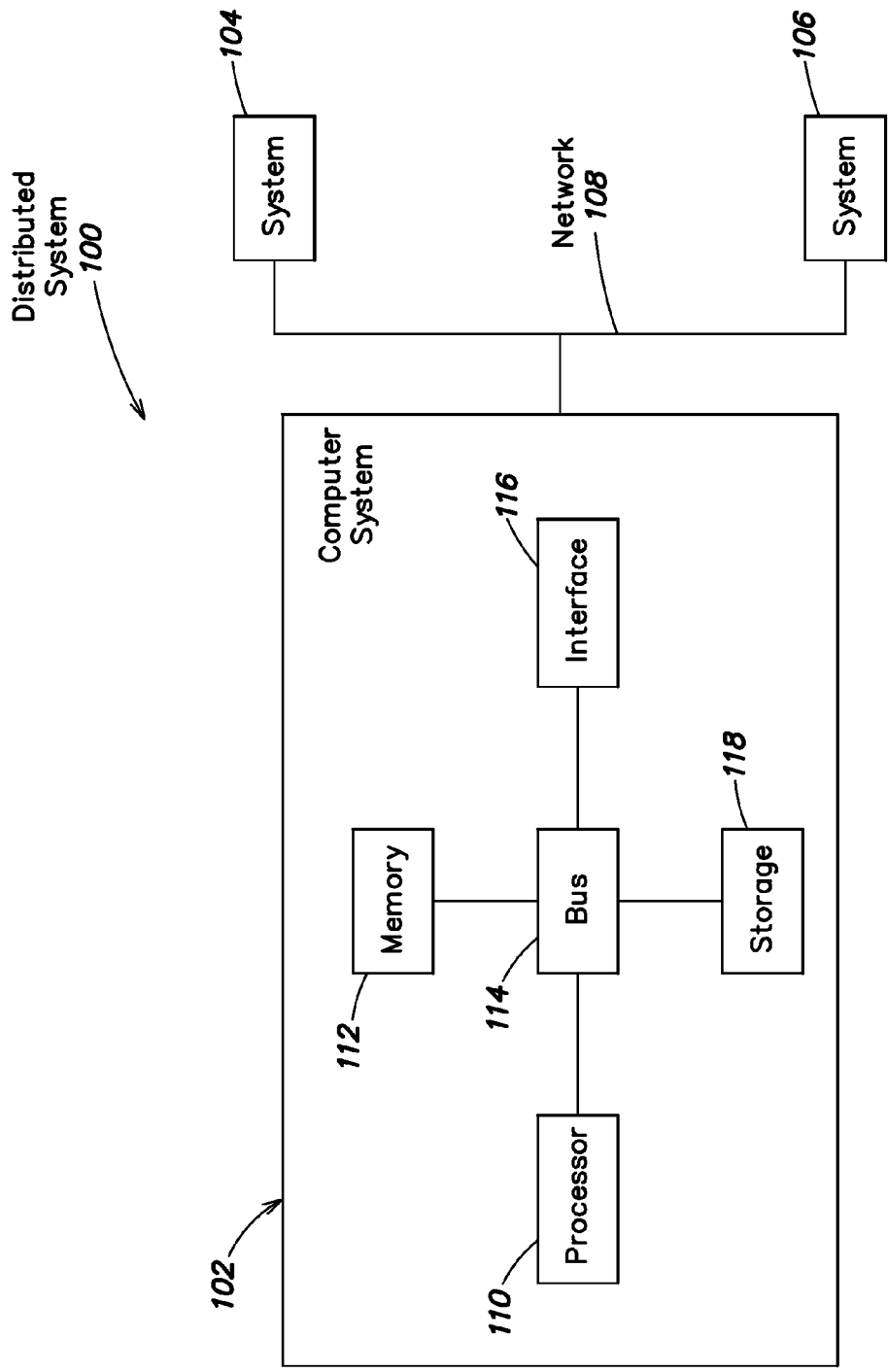
FIG. 1 illustrates an example computer system upon which various aspects in accord with the present invention may be implemented.

At least one embodiment in accord with the present invention relates to a system with facilities, i.e. executable code and data structures, configured to accept reservations for telephony services for a particular user at a particular workspace and time, and to activate those telephony services only upon confirmation that the user is physically present at that particular workspace.

The aspects disclosed herein, which are in accord with the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to various embodiments of the present invention, a computer system is configured to perform any of the functions described herein, including but not limited to accepting reservations for telephony services, as well as to activating and deactivating those services. However, such a system may also perform other functions. Moreover, the systems described herein may be configured to include or exclude any of the functions discussed herein. Thus, the invention is not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

In various embodiments of the present invention, a user is provided an opportunity at a user terminal to reserve a workspace for a future or present time, and to request custom telephony services at that workspace for that time. "Custom telephony services" as used hereinafter may include, among others, directing all telephone calls to a telephone number associated with the user to a telephone in the workspace, providing outgoing telephone service, and configuring the telephone with such customizations as the user's speed dial settings, personalized greeting, custom ringer settings, or other options.

At one or more times after the reservation is made but before its start time, the reservation may be validated by the system. That is, the system may ensure that a valid user, workspace, and telephone are associated with the reservation. The system may further confirm that it can communicate with the telephone, and that the telephone is operational and capable of receiving and carrying out instructions from other components of the system.

When the user arrives at the workspace at or near the reservation start time, he signals his physical presence at the workspace by "checking in" to the reservation system through use of a touch screen on the telephone in the workspace. Upon confirming the user's identity, the system provides custom telephony services at the telephone.

Though the user is variously described herein as "checking into," being "checked into," and being in a "checked in" state on any of the reservation system, a reservation, a workspace, and a telephone, the use of a certain one of these terms in relation to different systems is for conceptual and grammatical ease only. It will be understood that these terms interchangeably describe the same state or act of the system providing telephony services for a user holding a reservation at a particular telephone in a particular workspace.

Computer System

Various aspects and functions described herein in accord with the present invention may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Additionally, aspects in accord with the present invention may be located on a single computer system or may be distributed among a plurality of computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system elements and components using a variety of hardware and software configurations, and the invention is not limited to any particular distributed architecture, network, or communication protocol.

FIG. 1 shows a block diagram of a distributed computer system 100, in which various aspects and functions in accord with the present invention may be practiced. The distributed computer system 100 may include one more computer systems. For example, as illustrated, the distributed computer system 100 includes three computer systems 102, 104 and 106. As shown, the computer systems 102, 104 and 106 are interconnected by, and may exchange data through, a communication network 108. The network 108 may include any communication network through which computer systems may exchange data. To exchange data via the network 108, the computer systems 102, 104 and 106 and the network 108 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA BOP, RMI, DCOM and Web Services. To ensure data transfer is secure, the computer systems 102, 104 and 106 may transmit data via the network 108 using a variety of security measures including TSL, SSL or VPN, among other security techniques. While the distributed computer system 100 illustrates three networked computer systems, the distributed computer system 100 may include any number of computer systems, networked using any medium and communication protocol.

Various aspects and functions in accord with the present invention may be implemented as specialized hardware or software executing in one or more computer systems including the computer system 102 shown in FIG. 1. As depicted, the computer system 102 includes a processor 110, a memory 112, a bus 114, an interface 116 and a storage system 118. The processor 110, which may include one or more microprocessors or other types of controllers, can perform a series of instructions that manipulate data. The processor 110 may be a well-known, commercially available processor such as an Intel Pentium, Motorola PowerPC, SGI MIPS, Sun UltraSPARC, or Hewlett-Packard PA-RISC processor, or may be any other type of processor or controller as many other processors and controllers are available. As shown, the processor 110 is connected to other system elements, including a memory 112, by the bus 114.

The memory 112 may be used for storing programs and data during operation of the computer system 102. Thus, the memory 112 may be a relatively high performance, volatile, random access memory such as a dynamic random access memory (DRAM) or static memory (SRAM). However, the memory 112 may include any device for storing data, such as a disk drive or other non-volatile storage device. Various embodiments in accord with the present invention can organize the memory 112 into particularized and, in some cases, unique structures to perform the aspects and functions disclosed herein.

Components of the computer system 102 may be coupled by an interconnection element such as the bus 114. The bus 114 may include one or more physical busses (for example, busses between components that are integrated within a same machine), and may include any communication coupling between system elements including specialized or standard computing bus technologies such as IDE, SCSI, PCI and InfiniB and. Thus, the bus 114 enables communications (for example, data and instructions) to be exchanged between system components of the computer system 102.

The computer system 102 also includes one or more interface devices 116 such as input devices, output devices and combination input/output devices. The interface devices 116 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 116 allow the computer system 102 to exchange information and communicate with external entities, such as users and other systems.

The storage system 118 may include a computer readable and writeable nonvolatile storage medium in which instructions are stored that define a program to be executed by the processor. The storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor 110 or some other controller may cause data to be read from the nonvolatile recording medium into another memory, such as the memory 112, that allows for faster access to the information by the processor 110 than does the storage medium included in the storage system 118. The memory may be located in the storage system 118 or in the memory 112. The processor 110 may manipulate the data within the memory 112, and then copy the data to the medium associated with the storage system 118 after processing is completed. A variety of components may manage data movement between the medium and the memory 112, and the invention is not limited thereto. Further, the invention is not limited to a particular memory system or storage system.

Although the computer system 102 is shown by way of example as one type of computer system upon which various aspects and functions in accord with the present invention may be practiced, aspects of the invention are not limited to being implemented on the computer system, shown in FIG. 1. Various aspects and functions in accord with the present invention may be practiced on one or more computers having a different architectures or components than that shown in FIG. 1. For instance, the computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

The computer system 102 may include an operating system that manages at least a portion of the hardware elements included in computer system 102. A processor or controller, such as processor 110, may execute an operating system which may be, among others, a Windows-based operating system (for example, Windows NT, Windows 2000/ME, Windows XP, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, aspects in accord with the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various aspects and functions in accord with the present invention may be implemented in a non-programmed environment (for example, documents created in HTML, XML or other format that, when viewed in a window of a browser program, render aspects of a graphical-user interface or perform other functions). Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used.

A computer system included within an embodiment may perform functions outside the scope of the invention. For instance, aspects of the system may be implemented using an existing commercial product, such as, for example, Database Management Systems such as SQL Server available from Microsoft of Seattle, Wash.; Oracle Database from Oracle of Redwood Shores, Calif.; and MySQL from Sun Microsystems of Santa Clara, Calif.; or integration software such as WebSphere middleware from IBM of Armonk, N.Y. However, a computer system running, for example, SQL Server may be able to support both aspects in accord with the present invention and databases for sundry applications not within the scope of the invention.

At least one telephony device allowing for voice communication may also be provided with the system. The telephony device may be located in a workspace such as an office or cubicle at a work location or in a home office. The telephony device may comprise a computer system 102 as described above and seen in FIG. 1. It may be connected to a traditional switched PBX phone system as known in the art, or it may be enabled to operate as a voice-over-internet-protocol (VOIP) phone. The telephony device may be connected to and capable of exchanging data with a server through a communication network. The network may include any communication network through which computer systems may exchange data. To exchange data via the network, the server, the network, and the telephony device may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA BOP, RMI, DCOM and Web Services. To ensure data transfer is secure, the server, the network, and the telephony device computer systems 102, 104 and 106 may transmit data via the network 108 using a variety of security measures including TSL, SSL or VPN, among other security techniques. In one embodiment, the telephony device may be a CISCO voice or unified IP phone, however it will be understood that many telephony devices capable of carrying out the methods described herein may be used, including any video phone, unified phone, or voice-over-internet-protocol (VOIP) phone. The telephony device preferably has a touch screen or non-touch display and provides a mechanism for responding to simple confirmation questions, for example, soft keys on a touch screen display or physical buttons. However, it will be understood that a traditional phone could be used with an automated voice prompt to confirm the user's identity prior to activating telephony services at that workspace. Therefore, though the telephony device may be referred to hereinafter as a "telephone" or "phone," embodiments are not limited to any particular telephony device.

Example System Architecture

Figure 2:
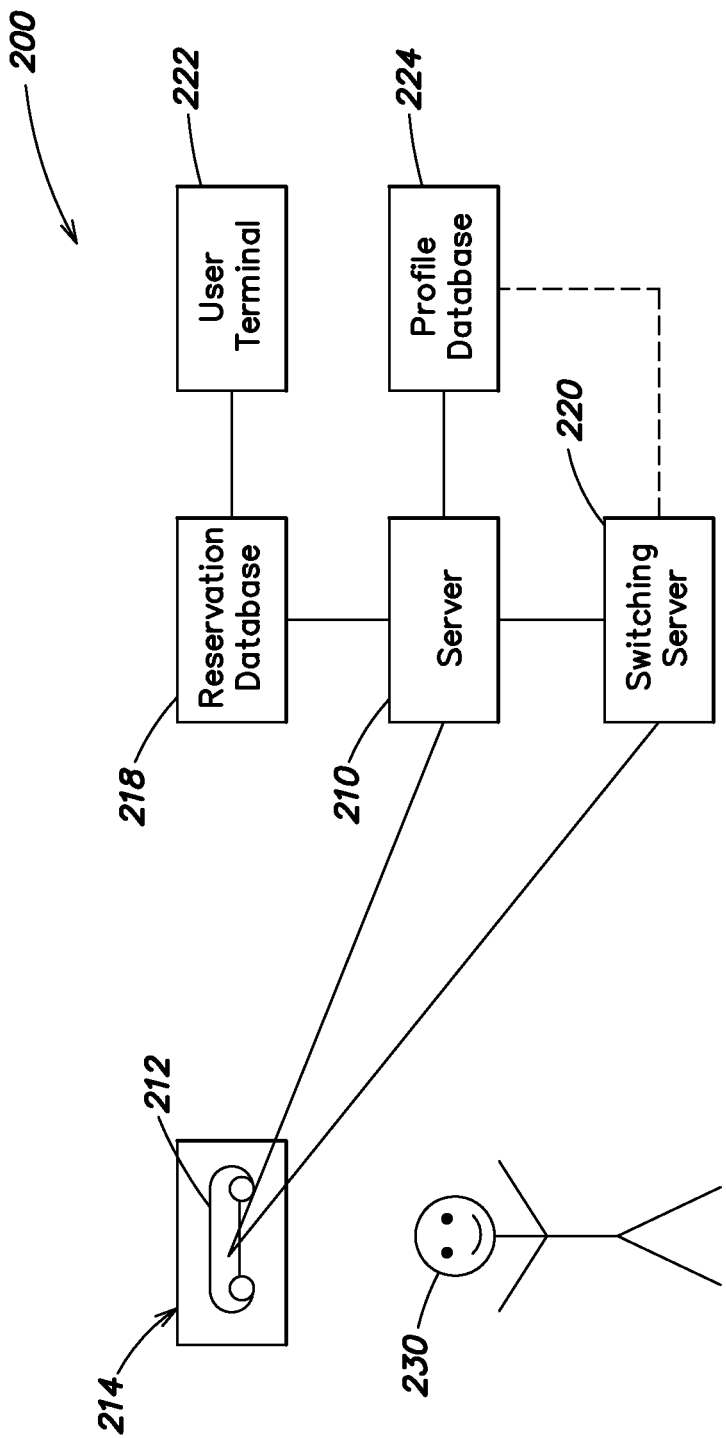
FIG. 2 depicts an example architecture of a system providing telephony services in the context of a distributed system according to an embodiment of the present invention.

FIG. 2 shows a block diagram of a reservation system 200 according to an embodiment of the present invention. Referring to FIG. 2, the system 200 includes a server 210, a telephone 212, a workspace 214, a reservation database 218, a switching server 220, a user terminal 222, and a profile database 224. The reservation database 218, the telephone 212, the switching server 220, and the profile database 224 are interconnected and able to interact as described below through their connection with the server 210. A user 230 is able to interact with the system 200 through the telephone 212 and the user terminal 222, which interacts with the reservation database 218, and in some embodiments with the server 210. In response to various events related to a reservation stored in the reservation database 218, the server 210 interacts with the user 230 via the telephone 212 and directs the switching server 220 to provide the user 230 with incoming and outgoing telephone service on the telephone 212. The switching server 220 accesses user preferences stored in the profile database 224 and sends them to the telephone 212, which configures itself according to those preferences.

As discussed above in regard to FIG. 1, the server 210, the telephone 212, the reservation database 218, the switching server 220, the user terminal 222, and the profile database 224 may be interconnected via any communication network or method through which member computer systems may exchange data. For example, the communication network may be a public network, such as the internet, and may include other public or private networks such as LANs, WANs, extranets and intranets.

The sundry computer systems shown in FIG. 2, which include the server 210, the telephone 212, the reservation database 218, the switching server 220, the user terminal 222, and the profile database 224 each may include one or more computer systems. As discussed above with regard to FIG. 1, such computer systems may have one or more processors or controllers, memory and interface devices. In certain embodiments, one or more of the elements depicted as being distinct elements in FIG. 1 may be implemented on the same system. For example, the server 210, the reservation database 218, the switching server 220, and the profile database 224 may all be implemented on the same computer system. The particular configuration of system 200 depicted in FIG. 2 is used for illustration purposes only and it should be appreciated that embodiments of the invention may be practiced in other contexts, as the invention is not limited to a specific number of users or to a specific number or type of systems.

In various embodiments, the server 210 is configured to communicate with the reservation database 218. For example, the reservation database 218 may send a notification to the server 210 upon the occurrence of an event or at the time a task is scheduled. The server 210 may notify the reservation database 218 that a user 230 is attempting to check into the reservation system 200 using the telephone 212. The server 210 may further query the reservation database 218 to confirm the reservation, and to retrieve information that will enable the server 210 to confirm the identity of the user 230.

In various embodiments, the server 210 is configured to communicate with the switching server 220. As will be described in detail below, upon receiving confirmation from the reservation database 218 that custom telephony services should be provided for a particular user 230 at a particular telephone 212, the user 230 is "checked in" to the reservation system 200. This means that the server 210 directs the switching server 220 to provide custom telephony services at the telephone 212. Similarly, the switching server 220 may later cause the user to be "checked out" of the reservation system 200 by ceasing to provide custom telephony services at the telephone 212. In certain embodiments, the switching server 220 may notify the server 210 upon completion of the task, or may provide error messages, alerts, or details in the event that a telephone 212 is unreachable or cannot be configured.

In various embodiments, the server 210 is configured to communicate with the telephone 212. The telephone 212 may be equipped with a touch screen, physical button, or other input device capable of being manipulated by a user to send input to the server 210. Similarly, the telephone 212 may be configured to receive information from the server 210 that can be used to confirm the identity of the user 230. As an example of one sequence of steps in an embodiment that will be described in more detail below, the user 230 may use an input device on the telephone 212 to signal her intent to check into the reservation system 200 at the telephone 212. The telephone 212 sends this information to the server 210, which contacts the reservation database 218 to determine if a reservation exists for the telephone 212 at that time. If a reservation does exist, the server 210 may cause the name of the user associated with the reservation to be displayed on the telephone 212, so that the user 230 can confirm their identity and check into the reservation system 200.

Referring still to FIG. 2, the reservation database 218 may include data structures configured to store and retrieve data relating to reservations, users, devices, work locations, or any other data useful for carrying out the steps disclosed herein. Data may include or reference any information that is conveyable via a computer system.

The reservation database 218 may take the form of any logical construction capable of storing information on a computer readable medium including flat files, indexed files, hierarchical databases, relational databases or object oriented databases. In addition, links, pointers, indicators and other references to data may be stored in place, of or in addition to, actual copies of the data. The data may be modeled using unique and foreign key relationships and indexes. The unique and foreign key relationships and indexes may be established between the various fields and tables to ensure both data integrity and data interchange performance.

Figure 3:
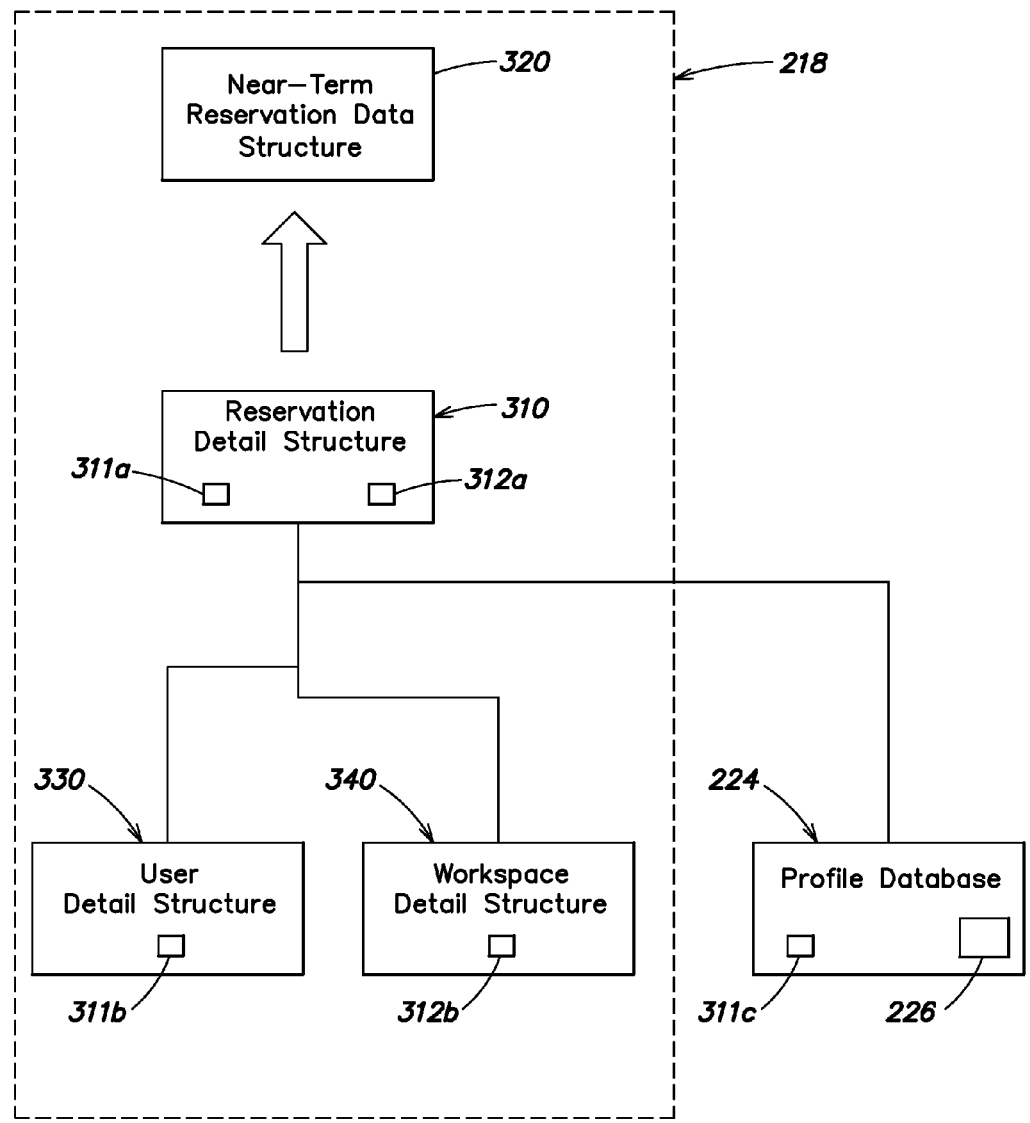
FIG. 3 depicts one aspect of the architecture of the system of FIG. 2 in more detail.

FIG. 3 shows a schematic depiction of the reservation database 218 in more detail. In various embodiments, the reservation database 218 may incorporate a reservation detail structure 310 for holding at least one record having reservation data about a reservation made for a particular workspace 214 or telephone 212, as well as metadata about the record itself. Examples of such reservation data and metadata include, among others, a unique reservation ID ("ID" is used herein to denote an identifier in a database that uniquely identifies some resource, for example, a user, workspace, or reservation), the time the reservation was created, a user ID 311a uniquely identifying the user 230 associated with the reservation, an identifier for identifying the person making the reservation (which may be a person other than the user), a workspace ID 312a uniquely identifying the workspace 214 where telephony service is desired, and the start time and end time, or alternately the start time and duration of the reservation. In a particular embodiment, a unique hardware address of the telephone 212 associated with the reservation, for example, the media access control (MAC) address, may be stored in the reservation database 218. In a specific embodiment, the reservation database 218 may be configured to store the reservation's status, for example, whether the reservation has been validated, whether the user 230 has checked in to the reservation, whether the user 230 has attempted to check in and failed, whether the reservation has been canceled or modified, or whether the user 230 has checked out of the reservation or attempted to check out and failed. In a further embodiment, the reservation database 218 may be updated with information determined at the time of check-in, for example, the actual start time of the reservation.

Referring still to FIG. 3, in various embodiments the reservation database 218 may further incorporate a user detail structure 330 for holding at least one record having user data about users of the system, as well as metadata about the record itself. Examples of such user data and metadata include, among others, the user's name, a unique user ID 311b associated with the user, the user's default workspace, home region, default telephone number, email address, other methods of contacting the user, and the user's privileges for creating, modifying, or deleting reservation data or user data for that user or other users. The "home region" of the user 230 may be assigned based on the geographic region where the user 230 works most often, or it may be based on any other criteria, for example, the region in which the user 230 lives. The home region may correspond to a particular state, part of a state, corporate campus, or telephone area code.

In some embodiments, the user detail structure 330 retains only data for those users who have actively signed up for an account, while in other embodiments it may be pre-populated with a universe of possible users, for example, all employees of an organization. The use of the unique user IDs 311a and 311b may be used to link a reservation in the reservation data structure 310 to one or more users about whom information is stored in user detail structure 330. It should be appreciated that only one of unique user IDs 311a and 311b may be used. For example, in some embodiments, the reservation data and user data may be stored in the same data structure and accessed by a unique user ID that is the same for both.

Referring still to FIG. 3, in various embodiments the reservation database 218 may further incorporate a workspace detail structure 340 for holding at least one record having location data about a workspace 214 associated with the system, for example, a workspace 214 having a telephone 212 configured to operate with the system. The workspace detail structure 340 may further hold metadata about the record. Examples of such workspace data and metadata include, among others, a unique workspace ID 312b associated with the workspace 214, the MAC address or other physical or logical address of the at least one telephone configured to operate with the system at the workspace 214, the address or other geographic descriptor of the workspace 214, the building, floor, and aisle information, the time zone in which the workspace 214 is located, and the accessibility of the workspace 214 for users with disabilities or other special needs. The workspace detail structure 340 may be configured to identify those users who are allowed to reserve any particular workspace. For example, a record corresponding to an executive suite may identify a group of executive-level users as being able to reserve the workspace 214, but may prevent others from doing so. The workspace detail structure 340 may further be configured to store contact information, such as phone numbers or email addresses, of personnel that should be contacted when an emergency, power outage, or other unexpected or scheduled disruption occurs at the workspace 214.

The workspace detail structure 340 may further be configured to store the availability of the workspace 214 for a set or range of particular time periods. For example, the workspace detail structure 340 may be configured to indicate whether the workspace 214 is available to be reserved for a particular span of dates or times at a desired granularity, for example, days or hours. The workspace detail structure 340 may be configured to be updated as reservations are made, modified, or canceled. The use of the unique workspace IDs 312a and 312b may be used to link a reservation in the reservation data structure 310 to a workspace 214 about which information is stored in workspace detail structure 340. It should be appreciated that only one of unique workspace IDs 312a and 312b may be used. For example, in some embodiments, the reservation data and workspace data may be stored in the same data structure and accessed by a single workspace ID.

Referring still to FIG. 3 and in a particular embodiment, the reservation database 218 may further incorporate a near-term reservation detail structure 320. The near-term reservation detail structure 320 may be a table, view, or other data structure known in the art, and may be populated with a subset of records from reservation detail structure 310, or may be populated with some subset of the fields of those records. In one embodiment, these records may correspond to reservations having a start time occurring within a predetermined period of time, for example, the current day, and are referred to hereinafter as "near-term reservations." In another embodiment, near-term reservations may further include those records that correspond to a reservation for a workspace for which there are multiple reservations for a particular period of time, for example, the current day. The near-term reservation detail structure 320 can be examined frequently for reservations scheduled to begin imminently, in order to ensure that all reservations can be activated without requiring a time- and resource-intensive full examination of the reservation database 218, which may contain some amount of historical and future data of little relevance to the activation of present reservations. In some embodiments, the unique user ID 311a and the unique workspace ID 312a may be stored in the near-term reservation detail structure 320, and may be used to link a reservation to a user record in user detail structure 330 and to a workspace record in workspace detail structure 340 in the same manner described above in relation to the reservation detail structure 310. These may be used as an alternative to or in conjunction with the unique user ID 311a and the unique workspace ID 312a in the reservation detail structure 310. It will be understood that any reference to a record relating to a reservation stored in the reservation database 218 may be stored in one or both of the reservation detail structure 310 or the near-term reservation detail structure 340.

Referring still to FIG. 3, in various embodiments a profile database 224 may be provided for holding at least one record storing a telephony profile 226 describing the telephone configuration preferences of the user 230, as well as metadata about the record. This profile data and metadata may include, among others, a unique user ID 311c identifying the user associated with the telephony profile 226, the user's long distance calling privileges, and the user's phone settings, such as speed dial configuration, personalized greeting, custom ringer settings, or other options. For example, if a user 230 has stored his mother's phone number in a first speed dial position, his home phone number in a second speed dial position, and has chosen a particular ringtone, this information can be sent to the server 210 and stored in the profile database 224. This information can then be sent to any other telephone 212 for which the user 230 has checked in to a reservation, and the information can be used to configure the telephone 212 according to the user's preferences. The use of the unique user IDs 311*a* and 311*c* may be used to link a user associated with a reservation in the reservation data structure 310 to that user's preferences stored in profile database 224. In some embodiments, some or all of the information in reservation database 218 and profile database 224 may be duplicated. In some embodiments, for example as seen in FIG. 2, reservation database 218 and profile database 224 are separate entities. In other embodiments the profile database 224 is incorporated as a table in the reservation database 218. For example, a user's telephone configuration information may be stored in a separate table of the same database. In a different example, a user's telephone configuration information may be stored with the user's other information in user detail structure 330.

As will be known to those of ordinary skill in the art, the use of one or more relational databases to represent the reservation detail structure 310, the near-term reservation detail structure 320, the user detail structure 330, the workspace detail structure 340, and the profile database 224 is for exemplary purposes only. The data can be stored in any suitable manner in any number of configurations. For example, the data represented in these embodiments as being stored among those various structures may be stored in a single table structure. However, it will be appreciated that a relational database structure is suited to storing and quickly retrieving information about a large number of items, for example, users, reservations, and workspaces.

Referring again to FIG. 2, the reservation database 218 can be accessed in a number of ways. In various embodiments, a user 230 may be able to access the reservation database 218 through the use of a user terminal 222. The user terminal 222 may allow the user 230 to make reservations through one or several guided forms. It may further allow the user 230 to directly query or view the reservation database 218 through use of a graphical or command line database program. In some embodiments, the user terminal 222 may support a web browser or other program running on a user's remote computer system, mobile phone, PDA, or other network-enabled device. This may allow the user 230 to create, modify, or cancel reservations in advance, or it may allow a reservation agent or other system administrator to do so on behalf of the user 230. In some embodiments, the user 230 may be able to access raw historical data or generate summary or statistical data from the reservation database 218. In some embodiments, the user terminal 222 may be a system located remotely from the server 218 but capable of interacting with the server 218 by use of a network connection. In various embodiments, the user terminal 222 may be a physical kiosk located at or near the location of the workspace 214. For example, the user terminal 222 may be located near the entrance to a building having at least one workspace 214, in order that the user 230 may make a reservation for the workspace 214 on relatively short notice. Alternately, the user terminal 222 may be physically remote from the workspace 214, or may be portable, for example, a laptop computer used by the user 230.

In various embodiments, the reservation database 218 is accessible by the server 210. For example, the server 210 may periodically query the reservation database 218 to validate information about upcoming reservations. As a further example, the server 210 may regularly access the reservation database 218 to determine if there are any "imminent reservations" (defined herein as reservations having a start time occurring within a predetermined amount of time from the present time, for example, one minute) and take action accordingly. In various embodiments, a user 230 may be able to access the server 210, either directly or through a remote connection, and perform some or all of the same functions on reservation database 218 as described above in conjunction with the user terminal 222.

In various embodiments, the reservation database 218 may be capable of storing and running stored procedures as are known in the art. For example, as will be described in more detail below, a stored procedure may be scheduled to run each night and return a list of telephones 212 that are reserved for a different user than the day before. The user associated with the previous day's reservation can be checked out of the earlier reservation for the telephone 212 via the switching server 220, or some other action can be taken.

In various embodiments, the reservation database 218 may be configured to grant users a set of privileges corresponding to tasks that can be performed on the reservation database 218. For example, some users, such as system administrators, may be able to create, modify, and delete reservations for any user as desired. By way of further example, a different group of users, such as reservation agents, may have the same set of privileges as a system administrator, or they may be modified; for example, privileges could be set whereby a reservation agent is not able to modify reservations after the time at which the reservation was to begin. As a further example, personnel managers may have privileges to create, modify, and delete reservations on behalf of themselves and their subordinates. As yet another example, end users, such as employees, clients, or contractors, may have privileges to create, modify, and delete reservations on their own behalf, or alternately they may be prevented from deleting reservations once they have been created, for example. In some embodiments, some users may be allowed to create simultaneous reservations for more than one workspace. In one embodiment, users may be assigned individual privilege levels. In another embodiment, users may be assigned to groups for which all members have a defined set of privileges. In yet another embodiment, a hybrid of these approaches is employed.

In one embodiment of the reservation database 218, business rules as are known in the art can be applied to the reservation database 218. For example, users or their departments may be charged when a user creates a reservation, or when a user cancels a reservation without sufficient advance notice. In a different example, some users may be prioritized such that they can pre-empt other users' reservations should they need a space that is already booked.

Referring to FIG. 2, in various embodiments, a switching server 220 is provided to run a service that actively monitors incoming requests from the server 210 to activate or deactivate telephony services on a particular telephone 212. The switching server 220 may execute software capable of activating or deactivating telephony services in response to requests and may, for example, be based on an existing known and commercially-available product, such as Unified Communications Manager sold by Cisco Systems of San Jose, Calif. In other embodiments, some aspects of activating or deactivating telephony services may be carried out by hardware components. The switching server 220 may activate or deactivate telephony services at a telephone 212, for example by routing all phone calls to a user's assigned telephone number to the telephone 212, and by providing access to outgoing telephone lines through telephone 212. In various embodiments, the switching server 220 is further configured to poll the telephone 212 to ensure that it exists, is connected, and is capable of communicating with one or both of the server 210 and the switching server 220. The switching server 220 may be configured to report the results of this polling to the server 210, so that additional steps may be taken when warranted.

In various embodiments, the switching server 220 is configured to communicate with the profile database 224. As will be described in detail below, the profile database 224 may store information on the preferences of the user 230 with respect to the telephone 212, for example, the user's speed dial configuration, personalized greeting, custom ringer settings, or other options. The switching server 220 may retrieve these preferences from the profile database 224 and send them to the telephone 212 so that the telephone 212 may be configured according to these preferences. In certain embodiments, the switching server 220 or the server 210 may update the profile database 224 with new information retrieved from the telephone 212.

In some embodiments, the server 210 may be configured to request or receive from the profile database 224 a telephony profile 226, which is delivered to the telephone 212. In an alternative embodiment, it may be the switching server 220 that is configured to request or receive from the profile database 224 the telephony profile 226 and deliver it to the telephone 212. This alternative embodiment is represented by the dashed connection between the switching server 220 and the profile database 224 seen in FIG. 2. The telephony profile 226 is used to configure the telephone 212 according to the user's preferences, for example by configuring the user's speed dial settings, personalized greeting, custom ringer settings, or other functionality provided with the telephone 212.

Referring still to FIG. 2, in various embodiments a telephone 212 is provided at a workspace 214. The telephone 212 may be configured to receive and send data to and from the server 210 and the switching server 220. The telephone 212 may be provided with at least one button or other input device, for example soft keys on a touch screen, in order that the user 230 may interact with one or both of the server 210 and the switching server 220. In various embodiments as described above, the telephone 212 may be configured to receive a telephony profile 226 representing the preferences of user 230 regarding the functionality of telephone 212 and update its configuration accordingly. In various embodiments, the telephone 212 may provide limited functionality even when no user 230 is checked into the telephone 212. For example, the telephone 212 may provide the option of contacting emergency services, or may further provide the ability to speak to a reservation agent and make a reservation for that workspace 214 and telephone 212.

In various embodiments, the telephone 212 may be configured to send status information about the telephone 212 to the server 210 or to the switching server 220. This information may be sent periodically or in response to polling or requests by the server 210 or the switching server 220.

In various embodiments, the server 210 and the switching server 220 may not exist as separate physical entities, but may be implemented as executable code running on one or more processors 110 as seen in FIG. 1.

In one embodiment, the system 200 is configured to operate under heavy load and high traffic volume conditions. The connections provided between the various system components described above in relation to FIG. 2 may be of a bandwidth or speed many times greater than that needed under ordinary operating conditions.

In one exemplary embodiment, threading may be employed, wherein several threads within a process may be run concurrently by any of the computer systems described in relation to FIG. 2. The threads may share memory and other system resources, in order to alleviate bottlenecking and other undesirable processing behavior. For example, each thread may correspond to requests for telephony service originating at a particular site. In this way, requests from each site can be handled concurrently to avoid system outages or undue delays.

In another embodiment, the server 210 may be configured to queue multiple check-in and check-out requests from the telephone 212 and pass them all at once to the switching server 220 upon satisfaction of a condition, for example, the accumulation of a certain number of requests, or at a specified time interval. In this way, communication between the server 210 and the switching server 220 is minimized, reducing network traffic.

Figure 4:
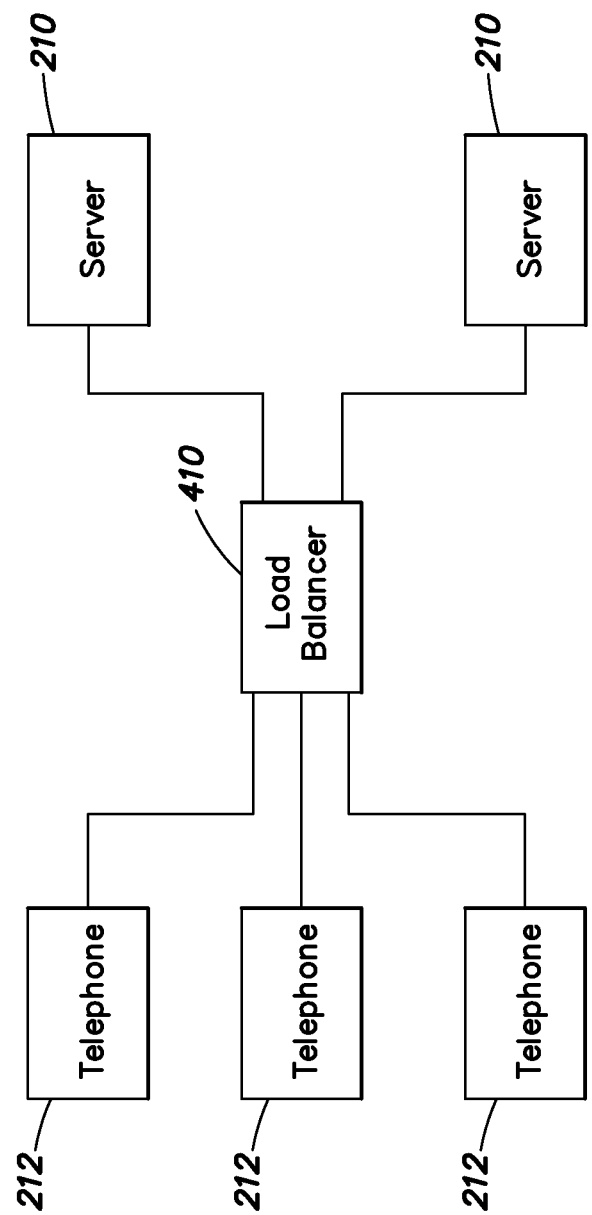
FIG. 4 depicts some aspects of an alternative example architecture of a system providing telephony services in the context of a distributed system according to an embodiment of the present invention.

In yet another embodiment, part of which can be seen in FIG. 4, multiple servers 210 and one or more load balancers 410 may be employed to handle the processing load associated with check-in requests from multiple telephones 212. The load balancer 410 may be configured to receive check-in requests from the multiple telephones 212 and distribute the requests among the servers 210 in a balanced manner to efficiently utilize system resources without overwhelming any individual server 210. In another embodiment, a similar configuration including a load balancer 410 may be used to provide redundancy and high availability in the event that one server 210 fails. The load balancer 410 may be a software program running on a computer system similar to those described in relation to FIG. 1, or it may be a hardware device such as a multilayer switch.

Having described various aspects of a reservation system in accordance with the present invention, operation of such a reservation system is now described.

Creating a Reservation

Referring to FIG. 2, in various embodiments facilities may be provided allowing users to create reservations. These reservations identify a user 230 associated with the reservation and a start time for the reservation. In some embodiments, the reservation may identify a particular telephone 212 by a unique physical or network address, such as a MAC address, IP address, or URL. In other embodiments, the reservation may identify a workspace 214 in which a telephone 212 is located. The duration of the reservation may be indicated by either a numerical duration, for example, in hours, or may alternately be indicated by an end time. The start time and end time may denote the local time where the workspace 214 is located, or alternately may denote a universal time associated with the system, for example, Coordinated Universal Time (UTC).

For purposes of these examples, "advance reservations" are those reservations created earlier than the day of the start time of the reservation. "Same-day reservations" are those reservations created on the same day as the start time of the reservation "Immediate reservations" are a subset of same-day reservations, and are reservations having a start time corresponding to the time the reservation is made; that is, a user can check into the reservation system 200 as soon as the immediate reservation is created.

Referring again to FIG. 2, in various embodiments the user 230 can create a reservation by interacting with either of the user terminal 222 or server 210. The system may be configured such that advance reservations may be created for any time in the future, or alternately so that reservations may be created only for a particular time period, for example, the current year, or a window of 12 months from the current date. In some embodiments, one or both of immediate reservations and same-day reservations may be allowed.

In other embodiments, the user 230 telephones a system coordinator, reservation concierge, or other third party, who may interact with a user terminal 222 or server 210 to create a reservation in accordance with the scheduling needs and preferences of the user 230. In some embodiments, the telephone 212 in the workspace 214 that the user 230 wishes to reserve may provide functionality for the user 230 to reach a system coordinator, reservation concierge, or other third party and create a current or advance reservation in this manner.

In some embodiments, business rules may be applied such that the user 230 or the department or team associated with the user 230 is billed upon creation of a reservation. These rules may be set such that the user 230 is billed different amounts for immediate reservations, same-day reservations, advance reservations in the near future, and advance reservations occurring farther in the future. In some embodiments, an individual billing amount may be set for each workspace 214.

In various embodiments, during the reservation creation process, the user 230 is presented with a textual or graphical list of workspaces 214 that are available to the user 230 for the time and location desired. For example, a map of a facility may be presented to the user 230, who may then select the workspace 214 of her choosing.

In other embodiments, the user 230 may simply enter reservation parameters and preferences, for example, the desired city, state, date, and start time of the reservation, and the system may automatically choose the workspace 214 from a pool of available workspaces based on those parameters and preferences. In a further embodiment, the system may apply business rules in assigning a workspace 214 from the pool of available workspaces to maximize efficiency and minimize costs. For example, the system may sequentially assign adjacent workspaces as reservations are created in order to consolidate the workspaces in use at any given time, which may reduce building operating costs such as those associated with electricity, HVAC, and janitorial services.

In various embodiments, an assigned telephone number is associated with the user 230 at the time the reservation is created. For example, if the user 230 has reserved a workspace 214 in her home region, her default telephone number may be assigned. In various embodiments, the assigned telephone number will always be the user's default telephone number, regardless of whether the workspace 214 is in her home region or not. In other embodiments, if the user 230 has reserved a workspace 214 outside of her home region, a guest or temporary extension may be assigned. In some embodiments, the user 230 may have a permanently assigned guest extension at each work location. In other embodiments, the user 230 may be assigned a guest extension selected randomly from a pool of available guest extensions. In one embodiment, the assigned telephone number is generated at the time the reservation is created and displayed to the user 230. In other embodiments, the assigned telephone number is generated at the time the user 230 checks in to the reservation. In various embodiments, the assigned telephone number may be a phone number within the exchange of the telephone 212, an internal extension, or an internal tie line.

In various embodiments, a user 230 may be allowed to create several simultaneous reservations for different workspaces. "Simultaneous reservations" are two or more reservations having the same start time or otherwise having a start time and duration such that, for at least some amount of time, the reservations cover the same time period. For example, a user 230 may know he needs to reserve a workspace for particular day and time, but he may not be sure whether he will working in Boston or Hartford at that time. The user 230 may be allowed to create simultaneous reservations for workspaces 214 in Boston and Hartford. As will be described in more detail below, the telephones 212 in either of the workspaces 214 will allow the user 230 to check into the reservation system 200 at the start time. Once the user 230 checks in to his reservation at one of the telephones 212, the system in some embodiments may immediately cancel the reservations at the other workspaces 214, allowing those workspaces 214 to be available for reservation by other users.

Pre-Validation of Reservations

Referring still to FIG. 2, in various embodiments one or more of the details of the reservation stored in the reservation database 218 are validated prior to the start time of the reservation. In some embodiments, the details of the reservation may be checked against one or more sets of data to ensure that the reservation can be checked into by the user 230 on or after the start time. For example, a component of the system, such as the reservation database 218 or the server 210, may confirm that the user ID 311*a* and default telephone number or assigned telephone number associated with the reservation are uniquely associated with a known user 230 having appropriate privileges. As a further example, the system may confirm that the workspace ID 312*a* uniquely identifies a valid workspace 214, and that the unique hardware address of the telephone associated with the reservation corresponds to a valid telephone 212 configured to work with the system. As yet another example, the system may confirm that the profile database 224 contains a telephony profile 226 associated with the user 230.

In other embodiments, the server 210 or switching server 220 may attempt to contact the telephone 212 at one or more times before the start time of the reservation to ensure that the telephone 212 is connected to the network and is capable of receiving data or carrying out instructions sent to it. For example, the server 210 may ping or otherwise poll the telephone 212 for its status at regular intervals or at set times. In some embodiments, a copy of the telephony profile 226 stored in the profile database 224 may be sent to the telephone 212 prior to the start time of the reservation, with the telephone 212 not being configured according to the telephony profile 226 until the start time of the reservation.

Referring still to FIG. 2, in various embodiments the system is configurable such that, if one or more of the details associated with the reservation cannot be validated in the manner described above, one or more of the user 230, a system coordinator, a reservation concierge, or other third party may be notified to take further action. For example, if the server 210 or switching server 220 cannot contact the telephone 212 after one or more failed attempts, the server 210 or the reservation database 218 may flag the reservation and notify a system administrator having access to the workspace 214 and telephone 212 so that maintenance or repairs can be performed. In some embodiments, the user 230 may be notified and given instructions or assistance on the steps to be performed in order to modify the reservation as necessary.

In some embodiments, the reservation may be canceled or suspended if one or more reservation details cannot be validated at some time before the start time of the reservation. In other embodiments, default values may be assigned for one or more parameters that are not populated with reservation details. For example, if no default telephone number is stored for the user 230 associated with the reservation a temporary or guest telephone number or extension may be assigned. As a further example, if the user 230 is not associated with any telephone profile in the profile database 224, a default profile may be created for the user 230.

Reservations may be validated at different times in their life cycle depending on the length of time between the creation of the reservation and the start time of the reservation. For example, same-day and immediate reservations may be validated during the creation of the reservation or shortly thereafter. Advance reservations may be validated at some later scheduled time. For example, all advance reservations may be validated in a nightly batch process within a day of their creation. This batch process may be scheduled for some time when the system typically experiences low utilization, for example, in the early morning hours. Additionally or alternatively, in some embodiments reservations may be validated in a batch process shortly before their start time.

In various embodiments, one or more reservations may be manually validated, that is, the reservations may be validated immediately in response to an event or user input at user terminal 222, server 210, or reservation database 218. For example, a system administrator, system coordinator, reservation concierge, or other party having the necessary privileges may be provided with an interface where they can select one or more reservations to be immediately validated by the system. This may be desirable in situations where an imminent reservation has not yet been validated, or when a reservation failed to be validated during an earlier validation attempt. In other embodiments, a reservation may be validated immediately after it is created by user 230, that is, creation of the reservation is an event that triggers manual validation.

Check-In Process

A representation of an interface 500 of a telephone in accordance with one embodiment of the present invention can be seen in FIGS. 5A-5D. The interface 500 is a graphic-based and user-interactive display, and provides the user 230 with an information region 510, a display region 520, and an interactive region 530. The information region 510 provides general information to the user 230, for example, the local date and time, the name of the site in which the workspace 214 is located, and the assigned telephone number that is currently associated with the telephone 212. The display region 520 displays information relating to the current activity of the user 230. For example, the display region 520 may provide instructions to the user 230 when the user 230 is attempting to check into the reservation system 200, or may be used to display information for confirming the identity of the user 230.

The interactive region 530 may provide functional elements such as soft keys allowing the user 230 to interact with the server 210, the switching server 220, or other components of the system.

It will be appreciated by one of ordinary skill in the art that the information region 510, the display region 520, and the interactive region 530 may be arranged in any suitable manner on the interface 500. Further, it will be appreciated that one or more of the regions may be combined. For example, the display region 520 and the interactive region 530 may be combined, so that the name of the user associated with a reservation can be displayed to the user 230, and the user 230 can touch the name to confirm her identity and check into the reservation system 200.

When the server identifies that a workspace 214 has an imminent reservation, the system directs the telephone 212 in workspace 214 to enter a "ready state." In one embodiment, this means that the telephone 212 provides and configures the interface 500 to allow the user 230 associated with the reservation to check into the reservation system 200. While in the ready state, the interface 500 is configured to allow the user 230 to signal their physical presence at the telephone 212. The telephone interface 500 may provide some further functionality for controlling the telephone 212 or making telephone calls.

An example of the appearance of the interface 500 in the ready state in accordance with one embodiment of the present invention can be seen in FIG. 5A. In one embodiment, the display region 520 displays a message instructing the user 230 to touch the interactive region 530 to check into the reservation system 200. The interactive region 530 may provide the user 230 with one or more interactive components, such as soft keys, allowing the user to perform several functions. For example, the interactive region 530 may allow the user 230 to do one or more of the following: to check into the reservation system 200; to contact a reservation concierge; to contact emergency services; to check voicemail; to make local, internal, or long distance telephone calls; or to activate or change functionality of telephone 212, such as change the volume of the ringer. This functionality may be provided by sending one or more pieces of information to the server 210 in response to user input via the interactive components.

Figure 6:
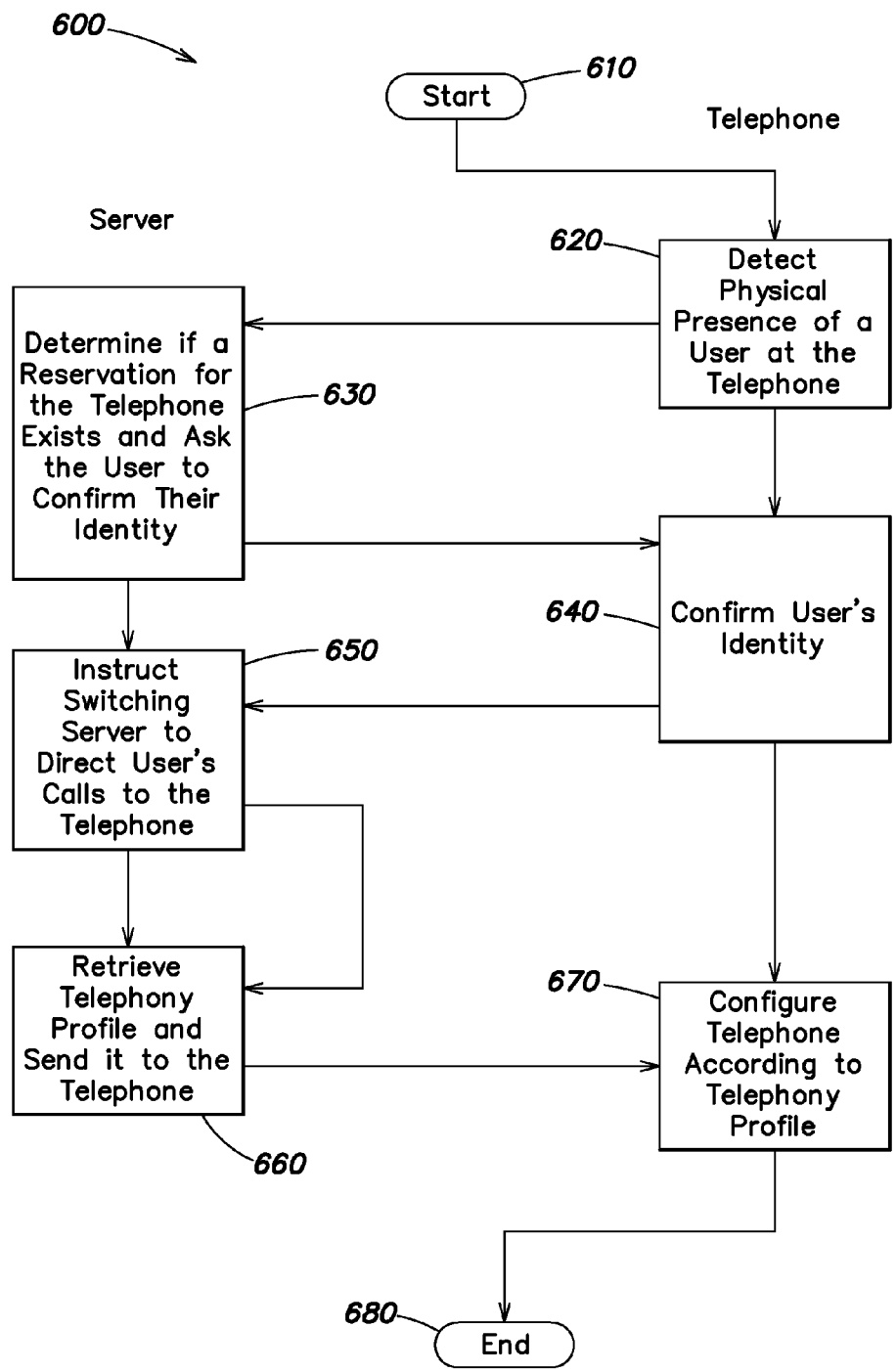
FIG. 6 depicts a check-in process according to one embodiment of the present invention.

FIGS. 5B-5D illustrate the interface 500 at various points in the process of checking into the reservation system 200 according to one embodiment of the present invention. The process of checking into the reservation system 200 in accordance with one embodiment can be seen at 600 in FIG. 6, beginning at act 610.

In act 620, the telephone 212 in the workspace 214 detects the physical presence of the user 230 at the telephone 212. In one embodiment, this is achieved by providing the user 230 with an input device for signaling her intent to check into the reservation system 200 on the telephone 212. This may be done, for example, through the use of a soft key located in the interactive region 530. The soft key may display an appropriate caption, such as "CHECK IN," as depicted in FIG. 5A. The telephone 212 sends a first message to the server 210 in response to the user input at the telephone 212. The first message may contain data explicitly identifying the telephone 212, or the server 210 may be configured to otherwise identify the telephone 212. The first message, and any other messages sent from the telephone 212 to the server 210, may be received at the server 210 by a check-in script, for example, an ASP.NET script running as a service on the server 210.

In act 630, the server 210 determines if a reservation exists for the workspace 214 and requests the user 230 to confirm her identity. In one embodiment, the server 210 queries the reservation database 218 to determine if there is a reservation associated with the telephone 212. If there is not a reservation associated with the telephone 212, the telephone 212 may enter an error state and indicate through the interface 500 that an error has occurred, specifically that no reservation exists for the telephone 212.

The appearance of the interface 500 in the error state in one embodiment of the present invention can be seen in FIG. 5B. In some embodiments, after a certain amount of time or after the user 230 acknowledges the error, the telephone 212 may return to the ready state. In other embodiments, the user 230 may be connected to a reservation concierge over the telephone 212.

Still in act 630, where it is determined that no error has occurred and a reservation is associated with the telephone 212, the server 210 sends a second message to the telephone 212. The second message may contain information about the user associated with the reservation, such as that user's name, user ID, default telephone number, or other information associated with the user.

In act 640, the telephone 212 confirms the user's identity. This may be accomplished by causing the information about the user associated with the reservation to be displayed to the user 230 through the interface 500 to confirm that the user 230 is the user associated with the reservation. This confirmation may be done by directing the telephone 212 to enter a confirmation state by displaying a confirmation screen containing some or all of this data and providing the user with the option to confirm or deny that this information identifies the user 230.

The appearance of the interface 500 in the confirmation state in accordance with one embodiment of the present invention can be seen in FIG. 5C. In this example, the interface 500 of telephone 212 displays the name of the user associated with the reservation in display region 520, and asks the user 230 to confirm or deny that they are the identified user by interacting with the interface at the interactive region 530. The interactive region 530 may provide a set of interactive keys, for example, a confirmation soft key and a cancel soft key. If the name displayed is not the name of user 230, then it may be the case that a user other than user 230 currently has a reservation for the telephone 212 in workspace 214. The user 230 may then press a soft key to cancel the check-in attempt, in which case the telephone 212 may return to the ready state depicted in FIG. 5A.

Still in act 640, in the event that the name displayed is the name of the user 230, the user 230 may confirm her identity by sending a third message to the server 210, in this example by pressing the confirmation soft key in the interactive region 530 in FIG. 5C. In certain embodiments, the third message contains data explicitly identifying the telephone 212, for example, a unique hardware address such as a MAC address. In other embodiments, the server 210 may be configured to otherwise identify the telephone 212. In one embodiment, no attempt is made to verify the identity of the user 230. In an alternative embodiment, the user 230 is required to enter a passcode, interact with a voice recognition system, or satisfy other security measures in order to confirm her identity. Upon receiving the third message from the telephone 212, the server 210 will have confirmed that the user 230 has a reservation for the workspace 214 containing telephone 212, and will have further confirmed that the user 230 is physically present at the workspace 214.

In act 650, the server 210 instructs the switching server 220 to direct calls for the user 230 to the telephone 212. In one embodiment, the server 210 or the switching server 220 may determine if calls for the user 230 are currently being directed to a telephone other than the telephone 212. For example, the reservation database 218 may be queried to determine if the user 230 is currently checked into a different workspace. In other embodiments, the switching server 220 may retain or have access to similar information. If it is determined that calls for the user 230 are currently being directed to a telephone other than the telephone 212, the switching server 220 may execute steps that cease to direct those calls to that telephone.

Still in act 650, the server 210 sends a fourth message directing the switching server 220 to begin directing all telephone calls for the user 230 to the telephone 212. The fourth message may be received at the switching server 220 by a process running as a service, for example, an ASP.NET or C# service. In some embodiments, the switching server 220 may begin providing outgoing telephone service through telephone 212 in accordance with information about the user 230, for example, her long-distance calling privileges. This information may be retrieved from the reservation database 218 or the profile database 224 and sent to the telephone 212 by the switching server 220.

In act 660, the server 210 retrieves the telephony profile 226 associated with the user 230 from the profile database 224, and sends the telephony profile 226 to the telephone 212. In other embodiments, the switching server 220, rather than the server 210, may retrieve the telephony profile 226 associated with the user 230 from the profile database 224, and send the telephony profile 226 to the telephone 212.

In act 670, the telephone 212 configures itself according to the preferences stored in the telephony profile 226. For example, if the telephony profile 226 reflects the wish of the user 230 that the first speed dial number of the telephone 212 should connect the user 230 to a remote voicemail system, the telephone 212 will be configured accordingly.

Upon being configured according to the telephony profile 226, the telephone 212 is placed in a checked-in state. The appearance of the interface 500 in the checked-in state in one embodiment can be seen in FIG. 5D. The information region 510 of the interface 500 may display such information as the assigned telephone number currently associated with the user 230, the name of the user 230, the local date and time, and other general or user-specific information. The display region 520 may display a log of the recent call activity of the user 230, or may be combined with the interactive region 530 to provide soft key functionality for speed dialing, voicemail access, call forwarding, and other telephone functionality, such as a numeric or alphanumeric keypad or controls for ringer settings. The interface 530 may further include soft key functionality providing the user 230 with the option to check out of the reservation system 200.

In various embodiments, once the user 230 is checked into the reservation system 200 at the telephone 212, the server 210 examines the reservation database 218 to determine if the user 230 has any simultaneous reservations with the currently checked-in reservation. If so, in some embodiments the server 210 or reservation database 218 may immediately cancel the other of the simultaneous reservations. In other embodiments, the other reservation may only be canceled after its start time, or may not be canceled at all.

Process 600 ends at act 680. Thus, the user 230 is checked into the reservation system 200 on the telephone 212, with the telephone 212 configured according to her preferences, and with all calls for the user 230 being directed to the telephone 212.

Check-Out Process

In various embodiments, the user 230 may be checked out of the reservation system 200 at a certain time or in response to an event. As will be described in more detail below, the user 230 may manually check out of the reservation system 200 at any time, or the system may check the user 230 out of the reservation system 200 at some time on or after the end time of the reservation.

Figure 7:
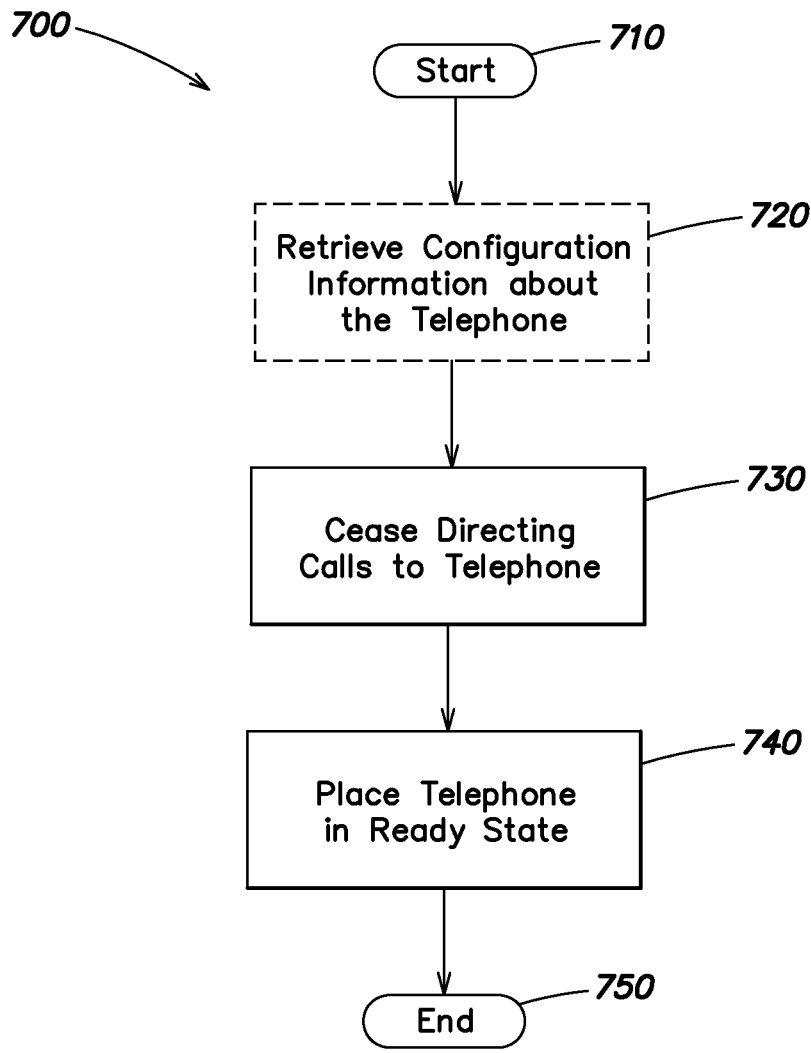
FIG. 7 depicts a check-out process according to another embodiment of the present invention.

A check-out process in accordance with one embodiment can be seen at 700 in FIG. 7, beginning at act 710.

In act 720, the server 210 or the switching server 220 receives or retrieves from the telephone 212 information about the current configuration of the telephone 212. This information may include some or all of the type of information stored in the telephony profile 226, and may be transformed into a format similar to that of the telephony profile 226 for storage in the profile database 224. This allows the profile database 224 to reflect the current telephone preferences of the user 230 by incorporating any preference changes the user 230 may have made while checked into the reservation system 200. Act 720 can be optional, and may not be performed in all embodiments. For example, in some embodiments, act 720 may only be performed when the user 230 checks out of the reservation system 200 at a particular workspace, for example, her default workspace, whereas in other embodiments, act 720 is not performed at all (hence its depiction in dotted-line form).

In act 730, the switching server 220 ceases directing telephone calls for the user 230 to the telephone 212. The server 210 may instruct the switching server 220 to cease directing those calls to the telephone 212, and may further instruct the switching server 220 to take additional steps as appropriate. For example, in various embodiments, the switching server 220 may begin directing calls for the user 230 to a voicemail system configured to record and retain messages for the user 230. In other embodiments, the switching server 220 may begin directing all calls for the user 230 to a different telephone, for example, a telephone in the user's default workspace or the user's cell phone.

In act 740, the telephone 212 may return to a ready state as seen in FIG. 5A, or, if the telephone 212 has no imminent reservation associated with it, the telephone 212 may enter a non-configured state. In some embodiments, additional check-out measures may be taken. For example, any data retained by the phone, such as recently dialed numbers, may be purged from the memory or storage of the telephone 212.

Process 700 ends at act 750.

In various embodiments, the user 230 may manually check out of the reservation system 200 at any time while in the checked-in state, for example, through use of a soft key provided on the interface 500.

In various embodiments, the user 230 may be checked out of the reservation system 200 automatically on or after the end time of the reservation. In a further embodiment, at the end time of the reservation the user 230 may be provided with the option of extending the reservation if there is not another user having an imminent reservation for the workspace 214. Business rules may be applied to charge the user 230 or her department for an extension of time.

In some embodiments, the user 230 may be checked out without warning at the end time of the reservation. In other embodiments, at some time prior to the end time of the reservation the user 230 may be displayed a warning on the interface 500 that the reservation will be automatically checked out at the end time of the reservation.

In various embodiments, network traffic and bandwidth concerns associated with the check-out process may make it more desirable to leave users checked in after the end time of the reservation. In these embodiments, a regularly-scheduled batch check-out process may examine the reservation database 218 to identify all currently checked-in reservations for workspaces at which the users associated with the currently checked-in reservation is a different user that the user associated with the next reservation. The batch check-out process then instructs the switching server 220 to check the users out of the reservation system 200 at those workspaces in the method described above and seen in FIG. 7.

The batch check out process may run at a time of day where low network traffic is typically experienced, for example, at midnight or 1:00 AM. However, it will be appreciated that the batch check-out process may run at any time of day.

Scheduled Processes

It will be appreciated by one of ordinary skill in the art that the systems described in these embodiments are described as operating on a daily or 24 hour cycle for exemplary purposes only. Longer or shorter cycles, such as those encompassing one or more hours or days, are also contemplated. For example, rather than validating advance reservations or running the batch check-out process once every day, these processes may be scheduled to occur more frequently.

Administrative Views

In various embodiments, an administrative interface for monitoring data associated with reservations, telephones, users, telephony profiles, and other data and events associated with the systems and methods described herein is provided. For example, a system administrator or reservation concierge may be provided with an administrative interface at the server 210, the reservation database 218, or the user terminal 222. The administrative interface may provide a "dashboard" or other overview of the system status, and may display alerts when problems or predefined events occur in the system.

In various embodiments, the system administrator or reservation concierge may be able to "drill down" to see detailed information about components of the system. This detailed information may include, for example, the status of each telephone 212 associated with the system, such as whether it is in a ready state, whether a user is currently checked in to a reservation on the phone, the start time of the next reservation associated with the telephone, and any failed check-in attempts.

In further embodiments, the system administrator or reservation concierge may be provided functionality through the administrative interface to interact with system components through the interface. For example, in the event that a telephone is experiencing operation or network connectivity problems, an option may be provided to instruct the server 210 or the switching server 220 to reboot the telephone or take it offline.

In various embodiments, the system administrator or reservation concierge may be provided functionality to automatically summarize system performance or error data and generate reports or display other output.

Each of process 600 and 700 depicts one particular sequence of acts in a particular embodiment. The acts included in each of these processes may be performed by, or using, one or more computer systems specially configured as discussed herein. Thus the acts may be conducted by external entities, such as users or separate computer systems, by internal elements of a system or by a combination of internal elements and external entities. Some acts are optional and, as such, may be omitted in accord with one or more embodiments. Additionally, the order of acts can be altered, or other acts can be added, without departing from the scope of the present invention. In at least some embodiments, the acts have direct, tangible and useful effects on one or more computer systems, such as storing data in a database or providing information to external entities.

Any reference to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references to "an embodiment," "some embodiments," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects disclosed herein. References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence are intended to have any limiting effect on the scope of any claim elements.

Having now described some illustrative aspects of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention.

What is claimed is:

1. A method of directing calls placed to a telephone number associated with a user comprising acts of:
    receiving a reservation uniquely identifying the user, a workspace, and a start time;
    receiving a first message from a telephone device located at the workspace in response to a first input indicating a physical presence of the user at the telephone device on or after the start time;
    retrieving the reservation from a reservation database in response to receiving the first message;
    sending a second message to the telephone device based at least in part on a portion of the reservation identifying the user;
    receiving a third message sent in response to a second input confirming the physical presence of the user at the telephone device, the third message including an identifier of the telephone device;
    retrieving a user profile uniquely corresponding to the user from a user database, the user profile including a telephone number associated with the user and a set of telephone device configuration parameters uniquely corresponding to the user and including at least one of a speed-dial number, a personalized greeting, a custom ringer setting, and long distance calling privileges corresponding to the user; and
    directing calls placed to the telephone number associated with the user to the telephone device.

2. The method of claim 1, wherein the act of receiving the first message includes receiving a URL request on a web server.

3. The method of claim 1, wherein the second message includes a portion identifying the user.

4. The method of claim 3, wherein the second message includes a name of the user.

5. The method of claim 1, wherein the identifier of the telephone device includes a MAC address of the telephone device.

6. The method of claim 1, wherein the act of directing includes:
    sending a fourth message to a switching server requesting that the switching server route to the telephone device telephone calls placed to the number associated with the user.

7. The method of claim 1, wherein the act of retrieving the reservation includes:
    determining that calls placed to the telephone number associated with the user are not already directed to a second telephone device other than the telephone device.

8. The method of claim 1, wherein the act of retrieving the reservation includes:
    determining that calls placed to the telephone number associated with the user are already directed to a second telephone device other than the telephone device; and
    ceasing to direct to the second telephone device calls placed to the telephone number associated with the user.

9. The method of claim 8, wherein the act of ceasing to direct includes:
    sending a fourth message to a switching server requesting that the switching server not route to the second telephone device telephone calls placed to the number associated with the user.

10. The method of claim 1, further comprising an act of validating at least one parameter of the reservation prior to receiving the first message, the act of validating the at least one parameter of the reservation including at least one of:
    determining that a portion of the reservation identifying the workspace identifies a valid workspace; and
    determining that a portion of the reservation identifying the user identifies a valid user.

11. The method of claim 1, wherein the reservation further identifies an end time, the method further comprising an act of:
    ceasing, on or after the end time, to direct to the telephone device calls placed to the telephone number associated with the user.

12. The method of claim 1, wherein the act of directing further comprises providing the set of telephone device configuration parameters to the telephone device.

13. The method of claim 12, wherein the telephone device includes at least one configurable function button, and wherein the set of telephone device configuration parameters includes a mapping of the at least one configurable function button to at least one telephone function.

14. The method of claim 13, wherein the at least one telephone function includes at least one of speed-dialing a specified telephone number and connecting to a voice mailbox of the user.

15. A non-transitory computer readable medium comprising computer-executable instructions that, when executed on a processor of a server, perform a method of directing calls placed to a telephone number associated with a user, the method comprising acts of:
    receiving a reservation uniquely identifying the user, a workspace, and a start time;
    receiving a first message from a telephone device located at the workspace in response to a first input indicating a physical presence of the user at the telephone device on or after the start time;
    retrieving the reservation from a reservation database in response to receiving the first message;
    sending a second message to the telephone device based at least in part on a portion of the reservation identifying the user;
    receiving a third message sent in response to a second input confirming the physical presence of the user at the telephone device, the third message including an identifier of the telephone device;
    retrieving a user profile uniquely corresponding to the user from a user database, the user profile including a telephone number associated with the user and at least one telephone device configuration parameter uniquely corresponding to the user and including at least one of a speed-dial number, a personalized greeting, a custom ringer setting, and long distance calling privileges corresponding to the user; and
    directing calls placed to the telephone number associated with the user to the telephone device.

16. The non-transitory computer readable medium of claim 15, wherein the act of directing includes:
   receiving a fourth message, at a switching server, requesting that the switching server route to the telephone device telephone calls placed to the number associated with the user.

17. The non-transitory computer readable medium of claim 15, wherein the act of retrieving the reservation includes:
   determining that calls placed to the telephone number associated with the user are not already directed to a second telephone device other than the telephone device.

18. The non-transitory computer readable medium of claim 15, wherein the act of retrieving the reservation includes:
   determining that calls placed to the telephone number associated with the user are already directed to a second telephone device other than the telephone device; and
   ceasing to direct to the second telephone device calls placed to the telephone number associated with the user.

19. The non-transitory computer readable medium of claim 18, wherein the act of ceasing to direct includes:
   receiving a fourth message, at a switching server, requesting that the switching server not route to the second telephone device telephone calls placed to the number associated with the user.

20. The non-transitory computer readable medium of claim 15, wherein the method further comprises an act of validating at least one parameter of the reservation prior to receiving the first message, the act of validating the at least one parameter of the reservation including at least one of:
   determining that a portion of the reservation identifying the workspace identifies a valid workspace; and
   determining that a portion of the reservation identifying the user identifies a valid user.

21. The non-transitory computer readable medium of claim 15, wherein the reservation further identifies an end time, and wherein the method further comprises an act of:
   ceasing, on or after the end time, to direct to the telephone device calls placed to the telephone number associated with the user.

22. The non-transitory computer readable medium of claim 15, wherein the act of directing further comprises providing the at least one telephone device configuration parameter to the telephone device.

23. The non-transitory computer readable medium of claim 22, wherein the telephone device includes at least one configurable function button, and wherein the at least one telephone device configuration parameter includes a mapping of the at least one configurable function button to at least one telephone function.

24. The non-transitory computer readable medium of claim 23, wherein the at least one telephone function includes at least one of speed-dialing a specified telephone number and connecting to a voice mailbox of the user.

25. A system comprising:
   a telephone device located at a specific location, the telephone device configured to send a first message in response to a first input indicating a physical presence of a user at the telephone device; and
   one or more servers configured to receive the first message, and responsive to a determination that a reservation exists associating the user with the specific location during a time interval, to retrieve a user profile corresponding to the user that includes a telephone number associated with the user and a set of telephone device configuration parameters uniquely corresponding to the user and including at least one of a speed-dial number, a personalized greeting, a custom ringer setting, and long distance calling privileges corresponding to the user, and to request one or more switching servers to direct to the telephone device calls placed to a telephone number associated with the user responsive to a second message confirming the physical presence of the user at the telephone device.

26. The system of claim 25, wherein the one or more servers are further configured to validate at least one parameter of the reservation by determining that a first portion of the reservation identifying the specific location identifies a valid specific location and by determining that second portion of the reservation identifying the user identifies a valid user.

27. The system of claim 25, wherein the one or more servers are further configured to provide the set of telephone device configuration parameters to the telephone device.

28. The system of claim 27, wherein the telephone device includes at least one configurable function button, and wherein the telephone device is configured to map the at least one configurable function button to at least one telephone function based upon the set of telephone device configuration parameters uniquely corresponding to the user.

* * * * *

UNITED STATES PATENT AND TRADEMARK OFFICE
CERTIFICATE OF CORRECTION

| | | |
|---|---|---|
| PATENT NO. | : 8,644,473 B1 | Page 1 of 1 |
| APPLICATION NO. | : 12/430456 | |
| DATED | : February 4, 2014 | |
| INVENTOR(S) | : Robert Bardwell et al. | |

It is certified that error appears in the above-identified patent and that said Letters Patent is hereby corrected as shown below:

In the Specification:

Column 8, Line 19, delete "BOP" and insert -- IIOP --.

Column 8, Line 62, delete "InfiniB and" and insert -- InfiniBand --.

Column 10, Line 59, delete "BOP" and insert -- IIOP --.

Signed and Sealed this
Twenty-second Day of April, 2014

Michelle K. Lee
*Deputy Director of the United States Patent and Trademark Office*